United States Patent
Choi

(10) Patent No.: US 8,797,996 B2
(45) Date of Patent: Aug. 5, 2014

(54) INTER-NETWORK PACKET TRANSMISSION METHOD AND SYSTEM

(75) Inventor: Chi Won Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1092 days.

(21) Appl. No.: 12/142,275

(22) Filed: Jun. 19, 2008

(65) Prior Publication Data

US 2008/0316970 A1 Dec. 25, 2008

(30) Foreign Application Priority Data

Jun. 20, 2007 (KR) ........................ 10-2007-0060360

(51) Int. Cl.
*H04W 4/00* (2009.01)
*H04L 12/28* (2006.01)
*H04L 12/26* (2006.01)
*H04L 12/66* (2006.01)

(52) U.S. Cl.
USPC ........... 370/331; 370/332; 370/401; 370/241; 370/254; 370/356

(58) Field of Classification Search
CPC .................................................... H04W 80/04
USPC ........... 370/355, 356, 401, 254, 331; 455/443
See application file for complete search history.

(56) References Cited

U.S. PATENT DOCUMENTS

| | | | |
|---|---|---|---|
| 7,590,074 B1 * | 9/2009 | Dondeti et al. | 370/254 |
| 2005/0025164 A1 * | 2/2005 | Kavanagh et al. | 370/401 |
| 2005/0265363 A1 * | 12/2005 | Chen | 370/401 |
| 2005/0270981 A1 * | 12/2005 | Shaheen et al. | 370/241 |
| 2006/0126565 A1 * | 6/2006 | Shaheen | 370/331 |
| 2006/0140150 A1 * | 6/2006 | Olvera-Hernandez et al. | 370/331 |
| 2006/0159047 A1 * | 7/2006 | Olvera-Hernandez et al. | 370/331 |
| 2007/0127444 A1 * | 6/2007 | Gras et al. | 370/356 |
| 2008/0095119 A1 * | 4/2008 | Bachmann et al. | 370/332 |
| 2008/0165740 A1 * | 7/2008 | Bachmann et al. | 370/332 |

FOREIGN PATENT DOCUMENTS

| KR | 0465209 A | 1/2005 |
|---|---|---|
| KR | 2006-0036757 A | 5/2006 |

OTHER PUBLICATIONS

3GGP TSG SA WG2 Architecture—S2#49, Document S2-052513. Nov. 7-11, 2005. Yokosuka, Japan "Consideration of Inter Access System Handover between 3GPP and non-3GPP Access Systems".*
"Multiple Access Protocols for Mobile Communications: GPRS, UMTS and Beyond" by Alex Brand, Hamid Aghvami. Copyright 2002 John Wiley & Sons Ltd. ISBN:0-471-49877-7 (hardback); 0-470-84622-4 (electronic).*
"2.5 G Mobile Networks: GPRS and Edge" by Sumit Kasera, Nishit Narang, A P Priyanka. Copyright 2008 Tata McGraw-Hill Publishing Company Limited. ISBN: (13) 978-0-07-065692-5.*

* cited by examiner

*Primary Examiner* — Ian N Moore
*Assistant Examiner* — Kiet Tang
(74) *Attorney, Agent, or Firm* — Jefferson IP Law, LLP

(57) ABSTRACT

An inter-network packet transmission method and system in a vertical handover between the two different technology networks is provided. An inter-network packet transmission method includes tunneling between gateways of heterogeneous networks though an interface, updating a routing table of at least one of the gateways by exchanging information through the interface, and transmitting packets to a user equipment based the at least one updated routing table.

20 Claims, 5 Drawing Sheets

INTER-NETWORK PACKET TRANSMISSION METHOD AND SYSTEM

PRIORITY

This application claims the benefit under 35 U.S.C. §119 (a) of a Korean patent application filed in the Korean Intellectual Property Office on Jun. 20, 2007 and assigned Serial No. 2007-0060360, the entire disclosure of which is hereby incorporated by reference.

BACKGROUND OF THE INVENTION

1. Field of the Invention

The present invention relates to a vertical handover between a cellular network and Internet Protocol (IP) network. More particularly, the present invention relates to an inter-network packet transmission method and system for vertical handover between a cellular network and Internet Protocol (IP) network.

2. Description of the Related Art

When a dual mode User Equipment (UE) having a cellular communication interface and a Wireless Local Area Network (WLAN) interface attempts a vertical handover from a WLAN to a cellular network, the UE releases the IP address assigned from the WLAN and receives a new one from the cellular network. Here, vertical handover is a technique that allows a UE to roam between heterogeneous networks operating with different access technologies.

In a WLAN, an IP packet is delivered to a destination UE via an Access Point (AP) connected to an Access Router (AR). The AR is responsible for routing IP packets in the IP network and for vertical handover to and from the cellular network. The AP provides a network access service and acts as a bridge between the WLAN and wired network.

Recently, research has been done to develop a dual mode mobile terminal that supports voice and data call handovers between the cellular network and WLAN. Accordingly, an improved inter-system handover technique is required. A standard for inter-system voice call handover, using a Voice Call Continuity technique, has almost been finalized, and a standard for the inter-system data call handover technique is in the middle of being completed.

The $3^{rd}$ Generation Partnership Project (3GPP) specifies a Gi interface between a Gateway General Packet Radio Service (GPRS) Support Node (GGSN), which is an element of a cellular network, and a Packet Data Network (PDN), and a Wi interface between a Packet Data Gateway and a PDN. In order to hand over a data call between the circuit switched cellular network and the packet switched WLAN, it is required to modify a routing table to a Root Router to which the route to a destination terminal is connected or required to establish a new route between the two terminals using a Stream Control Transmission Protocol (SCTP).

In the case of the route modification technique, however, since the route to the root router is non-determinative, it is difficult to apply the conventional route modification-based handover to a delay sensitive real time packet transmission service. Also, the conventional SCTP-based handover technique is limited in universal application since both the terminals involved in a communication should support the SCTP.

SUMMARY OF THE INVENTION

An aspect of the present invention is to address at least the above-mentioned problems and/or disadvantages and to provide at least the advantages described below. Accordingly, an aspect of the present invention is to provide an inter-network packet transmission method and system that is capable of securing seamless packet transmission service in a handover between heterogeneous networks.

Another aspect of the present invention is to provide an inter-network packet transmission method and system that is capable of bridging packets between a cellular network and a WLAN.

An additional aspect of the present invention is to provide an inter-network packet transmission method and system that is capable of supporting a real time service such as a streaming service in a heterogeneous network handover without modification of a system architecture specified in the standard the system is based on.

A further aspect of the present invention is to provide an inter-network packet transmission method and system that is capable of securing the shortest routing path of a packet in a vertical handover between two heterogeneous networks.

In accordance with an exemplary embodiment of the present invention, an inter-network packet transmission method is provided. The method includes tunneling between gateways of heterogeneous networks though an interface, updating a routing table of at least one of the gateways by exchanging information through the interface, and transmitting packets to a user equipment based on the at least one updated routing table.

In accordance with another exemplary embodiment of the present invention, another inter-network packet transmission method is provided. The method includes tunneling between a user equipment and a first gateway of a wireless local area network, tunneling through an interface established between the first gateway of the wireless local area network and a second gateway of a cellular network to which the user equipment was previously connected, requesting, at the first gateway, an update of a routing table to the second gateway through the interface, updating, at the second gateway, the routing table, forwarding packets destined to the user equipment from the second gateway to the first gateway through the interface, and forwarding the packets from the first gateway to the user equipment.

In accordance with another exemplary embodiment of the present invention, yet another inter-network packet transmission method is provided. The method includes tunneling between a user equipment and a second gateway of a cellular network, tunneling through an interface established between the second gateway of the cellular network and a first gateway of a wireless local area network to which the user equipment was previously connected, requesting, at the second gateway, an update of a routing table to the first gateway through the interface, updating, at the first gateway, the routing table, forwarding packets destined for the user equipment from the first gateway to the second gateway through the interface, and forwarding the packets from the second gateway to the user equipment.

In accordance with another exemplary embodiment of the present invention, an inter-network packet transmission system is provided. The system includes a Gateway GPRS Support Node (GGSN) of a cellular network, a Packet Data Gateway (PDG) of a wireless local area network, and a user equipment supporting communication with the GGSN and the PDG, wherein an interface is established between the GGSN and PDG and routing tables of at least one of the GGSN and PDG are updated by exchanging information between the GGSN and PDG through the interface.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and phrases used in the specification and appended claims are provided to enable a clear and consistent understanding of the detailed description and the claims. Unless otherwise noted, the terms and phrases are to be understood according to conventional usage by those skilled in the relevant art. While the invention is shown and described with reference to certain exemplary embodiments thereof, it will be understood by those skilled in the art that various changes in form and details may be made therein without departing from the spirit and scope of the invention as defined by the appended claims and their equivalents.

Exemplary embodiments of the present invention relate to a packet switched inter-networking. In the following description, a handover method and mechanism between the network elements of a core network is described.

In the following description, when a dual mode UE moves from a cellular network to a WLAN or from a WLAN to a cellular network, the inter-network packet transmission method and system efficiently routes the packet transmitted by the UE through the shortest routing path. The inter-network packet transmission method and system of certain exemplary embodiments of the present invention operates in a vertical handover between a cellular network and a WLAN.

Figure 1:
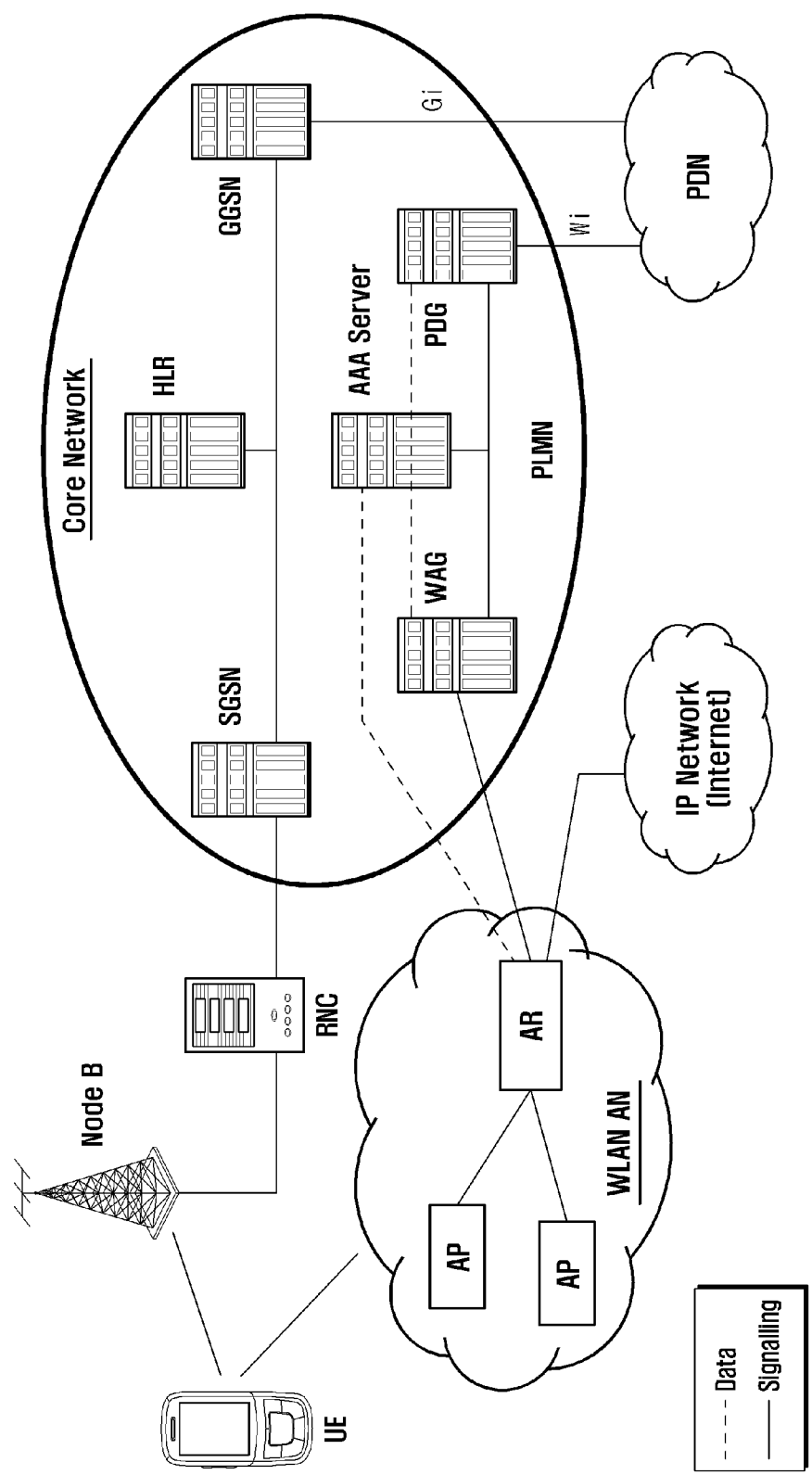
FIG. 1 is a schematic diagram illustrating a heterogeneous network environment according to an exemplary embodiment of the present invention.

FIG. 1 is a schematic diagram illustrating a heterogeneous network environment in which an inter-network packet transmission method and system is implemented according to an exemplary embodiment of the present invention.

In FIG. 1, a cellular network and a WLAN are deployed in an overlapping fashion. The cellular network includes network entities such as a node B, a Radio Network Controller (RNC), a Serving GPRS Support Node (SGSN), a Home Location Register (HLR), a Gateway GPRS Support Node (GGSN), and a Packet Data Network (PDN). The WLAN includes network entities such as Access Points (APs), an Access Router (AR), a WLAN Access Gateway (WAG), a Packet Data Gateway (PDG), an Authentication, Authorization, and Accounting (AAA) server, and a Packet Data Network (PDN).

The PDN connects to the PDG, and a plurality of WAGs are connected to the PDG. Each WAG is connected to an AR in a WLAN Access Network (AN) that includes a plurality of APs. The AR may be also connected to an IP Network such as the Internet. Although the PDN is depicted as a physically standalone entity, in can be implemented as a logical entity incorporated in the Core Network (CN).

The PDN also connects to the GGSN, the GGSN connects to SGSN, and the SGSN connects to RNC. A packet transmission procedure in the above structured heterogeneous network environment is described hereafter.

A UE can access the Node B and connect to the PDN via the RNC, SGSN, and GGSN such that voice and data communications are performed through a cellular communication channel.

The UE may also accesses the AP and connect to the PDN via the WAG and PDG such that voice and data communications are performed through an IP network channel. The UE can access the AP so as to be connected to the Internet.

As dual mode UEs having a cellular interface and a WLAN interface are widely used, research is being conducted on intersystem handover techniques. With respective to the case of voice calls, a standard for VCC-based handover technology has been finalized. However, a standard for intersystem handover technology related to data sessions is still being worked on.

The 3$^{rd}$ Generation Partnership Project (3GPP) specifies Gi reference point between a GATEWAY GPRS Support Node (GGSN), which is an element of a cellular network, and a Packet Data Network (PDN), and Wi reference point between a Packet Data Gateway and a PDN.

Accordingly, in order to perform a data session handover between the cellular network and the WLAN, it is required to modify a routing table of a router to a Root Router (RR) to which the route to a destination terminal is connected, or it is required to establish a new route between the two terminals using a Stream Control Transmission Protocol (SCTP).

In the case of the route modification technique, however, since the route to the root router is non-determinative, it is difficult to apply the conventional route modification-based handover to a delay sensitive real time packet transmission service. Also, the conventional SCTP-based handover technique is limited in universal application since both the terminals involved in a communication should support SCTP.

In an exemplary embodiment of the present invention, a new interface is defined between the GGSN and PDG such that data session handover is efficiently accomplished without adding a new network entity to the current inter-networking architecture. That is, the data packet can be transmitted between the GGSN and PDG, whereby a seamless handover can be achieved between the WLAN and cellular network.

Figure 2:
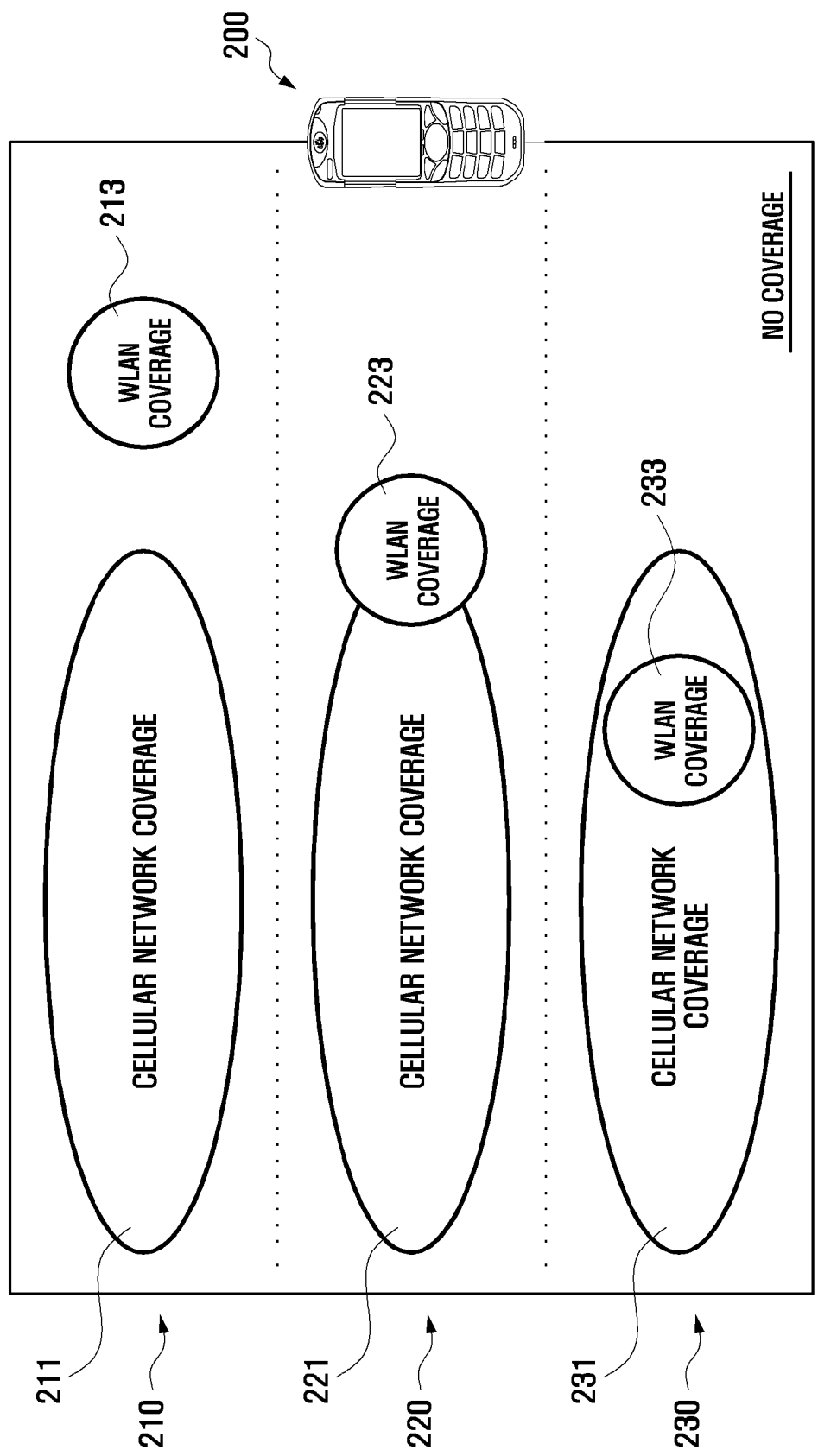
FIG. 2 is a conceptual diagram illustrating heterogeneous network environments to which an inter-network handover is adopted according to an exemplary embodiment of the present invention.

FIG. 2 is a conceptual diagram illustrating heterogeneous network environments to which an inter-network handover is adopted according to an exemplary embodiment of the present invention.

Referring to FIG. 2, a UE 200 may encounter a variety of distinct radio environments. In the first network environment 210, a cellular network 211 and a WLAN 213 are separately deployed such that their coverage areas do not overlap with each other. In the second network environment 220, the cellular network 221 and the WLAN 223 have coverage areas that partially overlapped. In the third network environment 230, a WLAN 233 is nested within a cellular network 231. The UE 200 can perform a handover in any of these network environments.

If the UE 200 is turned on, it operates in an idle state and performs scanning in order to discover a cellular network and/or WLAN.

If a cellular network is discovered, the UE 200 is associated with the cellular network through a well-known mobility management procedure. The mobility management procedure may be performed before a WLAN is discovered.

If a WLAN is discovered, the UE 200 establishes a wireless link with the AP and monitors the quality of a signal on the wireless link. If the received signal strength exceeds a predetermined threshold level, the UE 200 performs a registration to the WLAN. The WLAN registration procedure can be performed when no cellular network is discovered or when the WLAN is discovered before the cellular network is discovered.

If the UE 200 operates in idle state in association with the cellular network and no WLAN is discovered, the UE 200 periodically scans in order to discover a WLAN. If a WLAN is discovered, the UE 200 performs a registration procedure with the WLAN.

In a case where the UE 200 operates in idle state in association with the WLAN and no cellular network is discovered, the UE continues a cellular network discovery procedure.

If a cellular network is discovered while the UE 200 is operating in idle state in association with the WLAN, the UE 200 performs a cell reselection procedure.

As described above, the UE can roam across the coverage areas of the cellular network and WLAN.

Accordingly, a vertical handover procedure is required when the UE crosses a boundary between the cellular network and WLAN. In this exemplary embodiment, an improved data call handover procedure is introduced such that a seamless handover between the cellular network and WLAN can be achieved without deployment of an additional network entity.

In this exemplary embodiment, a new interface is introduced for accomplishing the seamless handover between the cellular network and WLAN. That is, a new interface is defined between the GGSN of the cellular network and the PDG of the WLAN without modification of the conventional system architecture, and a signaling is defined for updating a routing table of the GGSN and PDG. The newly defined network interface and signaling enables a reduction in the routing path of packets, thereby reducing redundant traffic.

Although the inter-network packet transmission system is described with a heterogeneous network handover environment of the cellular network and WLAN, the present invention is not limited thereto. For example, the packet transmission system of an exemplary embodiment of the present invention can be applied to a handover between various types of communication systems that are currently commercialized and those to be developed in the future.

Exemplary communication systems include the Global System for Mobile Communication system (GSM), CDMA2000, Code Division Multiple Access (CDMA), Wideband CDMA (WCDMA). Since the operational functions of these systems are known, detailed description of these system are omitted.

In this exemplary embodiment, it is assumed that the UE supports a cellular network communication and WLAN communication. The UE can be any of communication terminals (operating on the basis of Time Division Multiple Access (TDMA), GSM, CDMA, CDMA2000 and WCDMA), Portable Multimedia Player (PMP), MP3 player, digital broadcast receiver, Personal Digital Assistant (PDA), Smartphone, portable phone, laptop, and their equivalents having at least two wireless communication interfaces.

Figure 3:
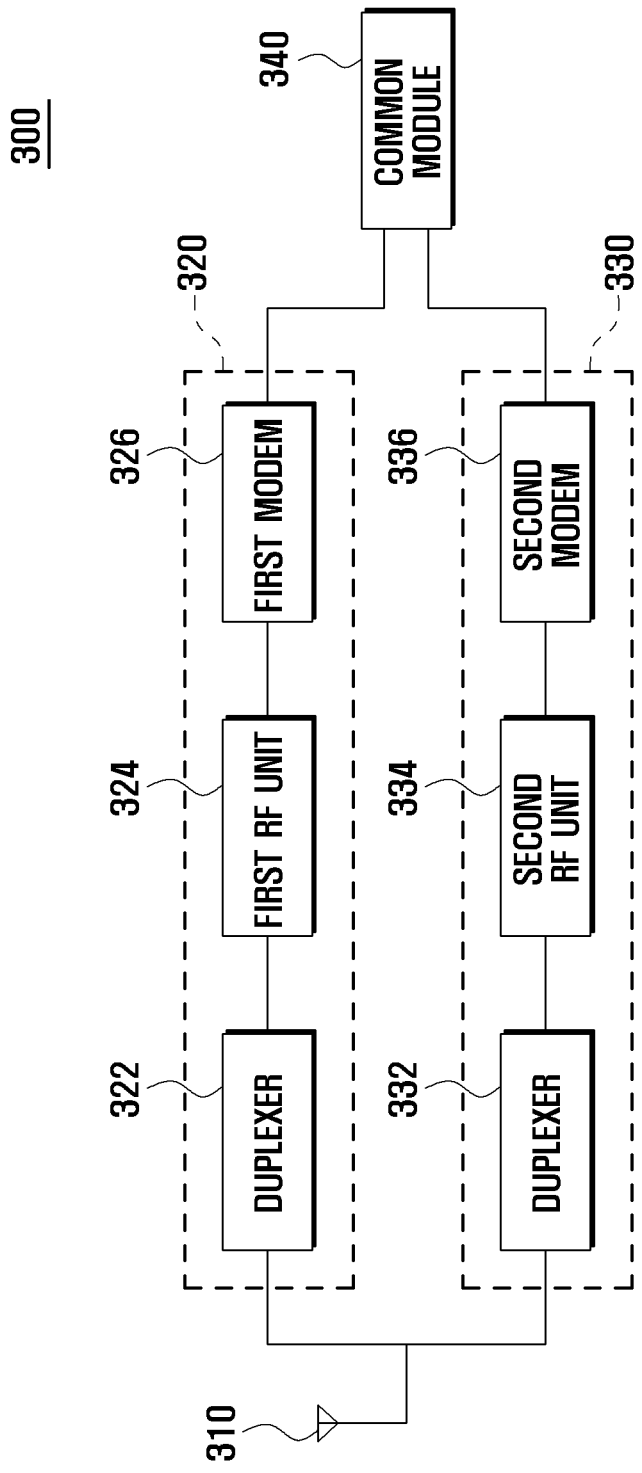
FIG. 3 is a block diagram illustrating a configuration of a dual mode UE according to an exemplary embodiment of the present invention.

FIG. 3 is a block diagram illustrating a configuration of a dual mode UE according to an exemplary embodiment of the present invention.

Referring to FIG. 3, the dual mode UE 300 includes an antenna 310, a first communication module 320 for processing cellular network communications, a second communication module 330 for processing WLAN communications, and a common module 340 for controlling operations and functions of the UE 300.

The antenna can receive and transmit signals of the cellular network frequency band and the WLAN frequency band. Although a single antenna is depicted in FIG. 3, the UE can be implemented with two antennas responsible for the cellular and the WLAN frequency bands respectively.

The first communication module 320 includes a duplexer 322 operating as a band pass filter and separating transmission and reception frequencies, a first Radio Frequency (RF) unit 324, and a first modem 326 for processing cellular communication protocols.

The second communication module 330 includes a duplexer 332 operating as a band pass filter and separating transmission and reception frequencies, a second RF unit 334, and a second modem 336 for processing WLAN communication protocols.

The common module 340 controls the operations of the first and second communication modules 320 and 330 and the general operations and functions of the UE 300. The common module 340 includes an application processor responsible for multimedia functions, a memory, an input/output unit, other application processors, and a controller for controlling signaling between the internal components.

If an incoming call is requested by a communication system or an outgoing call is requested by a user, the common module 340 determines which communication network is associated with the incoming or outgoing call and controls an establishment of a connection channel to a communication network by means of the first communication module 320 or the second communication module 330 according to the result of the communication network determination.

For example, if the incoming or outgoing call is requested in association with the cellular network, the common module 340 controls the first communication module 320 to establish a communication channel via the cellular network. In a case where the calls are requested in association with both the cellular network and the WLAN, the common module 340 selects one of the two networks in a preset priority order.

The common module 340 controls the operations of the first and second communication modules 320 and 330 according to the status of the communication services. For this purpose, the common module 340 is provided with software modules called software entities. The software entities (cellular network control entities and WLAN control entities) may reside on the controller.

The first and second communication modules 320 and 330 are provided with a first interface (cellular network interface) and a second interface (WLAN interface) respectively, and establish communication through the respective interfaces under the control of the common module 340.

As described above, the UE according to an exemplary embodiment of the present invention is provided with two communication modes.

The UE 300 can be configured such that the first and second communication modules 320 and 330 are activated simultaneously when it turns on. Also, the UE 300 can be configured such that one of the two communication modules 320 and 330 is activated according to a preset activation order. In this case, if the communication module activated first does not discover a corresponding network, the other communication module is activated to discover an appropriate network. In such manner, the UE can process the services provided by the cellular network and WLAN simultaneously.

In this exemplary embodiment, the UE 300 can be configured to have a preferable communication system mode such that one of the first and second communication modules 320 and 330, which is responsible for the preferable communication system, is activated to establish a communication channel with the corresponding communication network.

The UE 30 can be configured such that the first and second communication modules 320 and 330 are activated adaptively to the network environment, whereby one or two communication modules may be activated at a time.

The internal components of the UE and their functions have now been schematically described. An improved packet transmission method for a handover between heterogeneous networks is described hereinafter.

Figure 4:
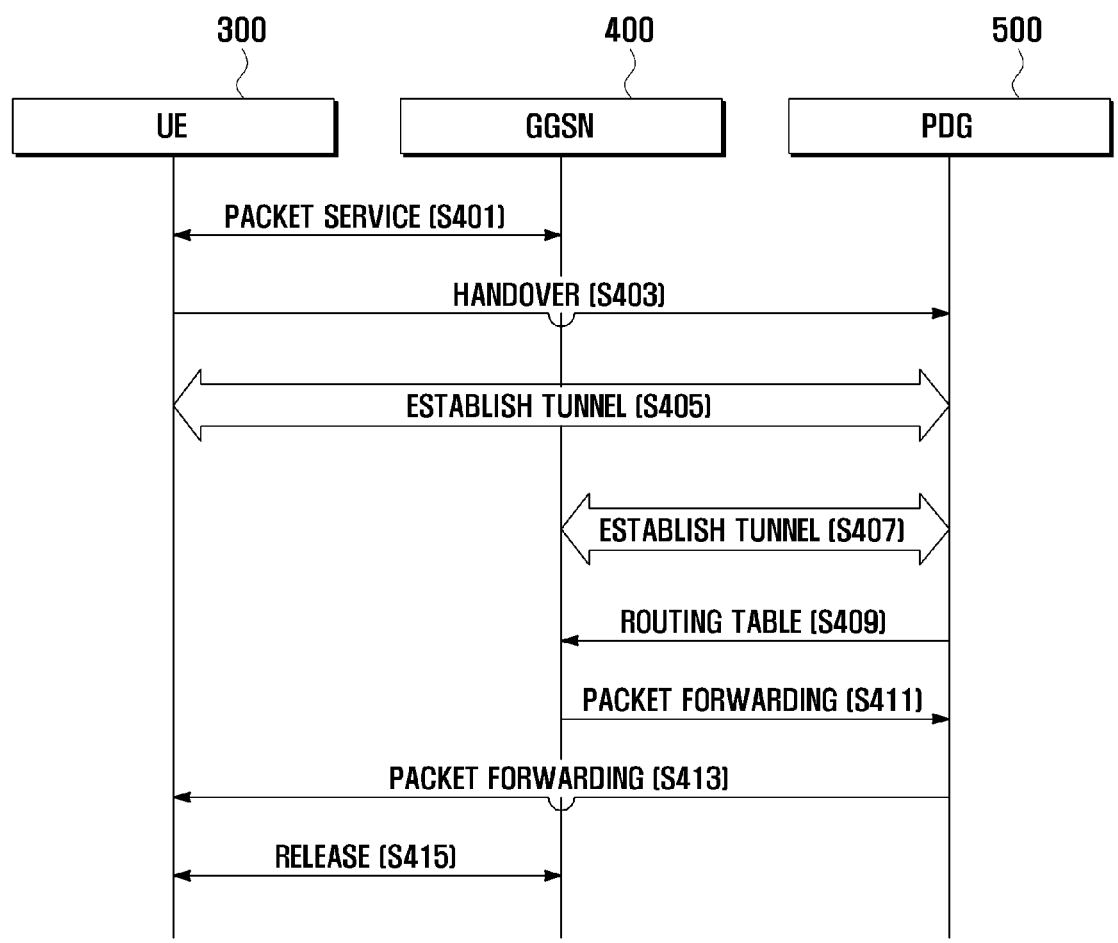
FIG. 4 is a message flowchart illustrating a handover procedure in an inter-network packet transmission system according to an exemplary embodiment of the present invention.

FIG. 4 is a message flowchart illustrating a handover procedure in an inter-network packet transmission system according to an exemplary embodiment of the present invention. In FIG. 4, a handover is performed from a cellular network to a WLAN.

In order to simplify the explanation, well-known handover related processes specified in the communication standard are not described in detail. Such typical handover processes may be performed before the procedure depicted in FIG. 4. In order to assist with an understanding of exemplary embodiments of the present invention, reference is made to the network entities GGSN, PDG, and PDN. FIG. 4 illustrates a packet delivery when the UE moves from a cellular network to a WLAN.

Referring to FIG. 4, the UE 300 is associated with a cellular network via a GGSN 400 receives packets from an arbitrary counterpart node in step S401.

Here, the UE 300 measures the radio environment periodically and reports the measurement to the GGSN 400. The GGSN 400 compares the measurement with a preset threshold value and, if the measurement value is less than the threshold value or it is determined that the connection to the cellular network, the GGSN 400 requests the UE to start scanning the other network. That is, the GGSN 400 may request a handover to another type of communication network.

If a handover request is received or it is determined that the current connection is difficult to maintain, the UE 300 starts scanning frequencies in order to discover another network. In this exemplary embodiment, the UE 300 can perform a handover in step S403 from the cellular network to the WLAN according to the above and other handover procedures (i.e., handover signaling including handover request, handover confirmation and handover acceptance) specified in the communication standard.

After the handover procedure from the cellular network to the WLAN handover, the UE 300 establishes a tunnel to the PDG 500 in the WLAN domain based on the PDG address which was acquired previously in step S405). The PDG address can be acquired through a signal (e.g. handover command (HO Command) message transmitted by the GGSN) exchanged during the handover procedure specified in the communication standard. The UE 300 may further perform an Internet Key Exchange Protocol version 2 (IKEv2) for establishing the tunnel to the PDG 500.

After the tunnel is established between the UE 300 and PDG 500, the PDG 500 establishes another tunnel with the GGSN 400 to which the UE 300 was previously connected in step S407). At this time, the tunneling procedure is performed through an Igp interface that is newly defined in exemplary embodiments of the present invention.

After the tunnel is established between the PDG 500 and the GGSN 400, the PDG 500 transmits a routing table update request message to the GGSN 400 through the Igp interface in step S409. At this time, the PDG 500 transmits its routing table to the GGSN 400 through the Igp interface, and the GGSN 400 updates its routing table with the address of the PDG 500 in response to the routing table update request message.

After updating the routing table, the GGSN 400 forwards the packets destined for the UE 300 to the PDG 500 through the Igp interface in step S411. Sequentially, the PDG 500 forwards the packets received from the GGSN 400 to the UE 300 in step S413. That is, the UE 300 can receive the packets transmitted by the counterpart node through the PDG 500 without breaking the packet stream. If packet forwarding is successful, the UE 300 releases the data communication session with the GGSN 400 in step S415.

Figure 5:
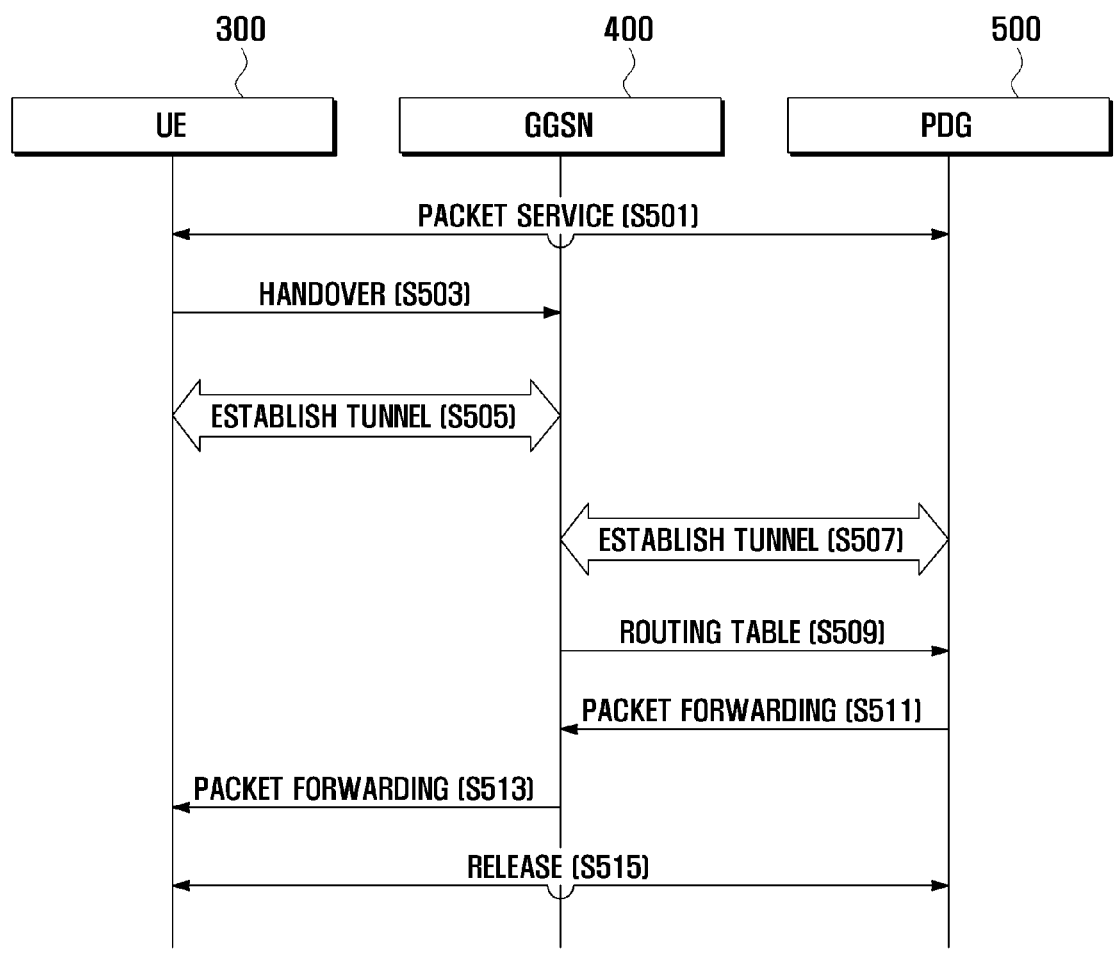
FIG. 5 is a message flowchart illustrating a handover procedure in an inter-network packet transmission system according to another exemplary embodiment of the present invention.

FIG. 5 is a message flowchart illustrating a handover procedure in an inter-network packet transmission system according to another exemplary embodiment of the present invention. In FIG. 5, a handover is performed from a WLAN to a cellular network.

In this exemplary embodiment, well-known handover related processes specified in the communication standard are not described in detail in order to simplify the explanation. In order to assist with an understanding of exemplary embodiments of the present invention, reference is made to the network entities GGSN, PDG, and PDN. Such typical handover processes may be performed before the procedure depicted in FIG. 5.

Referring to FIG. 5, the UE 300 is associated with a WLAN via PDG 500 and receives packets from an arbitrary node in step S501. While connected to the WLAN, the UE 300 determines if a handover to a cellular network is needed and if it is determined that the handover is needed, the UE 300 initiates the handover in step S503. The determination and handover are made according to a handover procedure specified in a communication standard.

If a handover from the WLAN to the cellular network is initiated, the UE 300 establishes a tunnel with the GGSN 400 in step S505. At this time, the UE 300 uses a network protocol used by an external packet data network (e.g., PDN) for communicating with the GGSN 400. The network protocol can be a Packet Data Protocol (PDP) with which information (e.g., billing ID) of the mobile service call and session establishment is specified such that a session between the UE 300 and the GGSN 400 can be identified.

After the tunnel is established between the UE 300 and the GGSN 400, the GGSN 400 establishes another tunnel with the PDG 500 to which the UE 300 was previously connected in step S507. At this time, the tunneling procedure is performed through an Igp interface that is newly defined in exemplary embodiments of the present invention.

After the tunnel is established between the GGSN 400 and the PDG 500, the GGSN transmits a routing table update request message to the PDG 500 through the Igp interface in step S509. At this time, the GGSN 400 transmits its address to the PDG 500 through the Igp interface, and the PDG 500 updates its routing table with the address of the GGSN 400 in response to the routing table update request message.

After updating the routing table, the PDG 500 forwards the packets destined for the UE 300 to the GGSN 400 through the Igp interface in step S511. Sequentially, the GGSN 400 forwards the packets received from the PDG 500 to the UE 300 in step S513. That is, the UE 300 can receive the packets transmitted by the counterpart node through the GGSN 400 without breaking the packet stream. If packet forwarding is successful, the UE 300 releases the data communication session with the PDG 500 in step S515.

As described above, when the UE 300 moves from the WLAN to the cellular network, the UE 300 can continuously receive the packets by performing a handover from the WLAN to the cellular network while maintaining its IP address associated with the WLAN. That is, the UE 300 receives the packets transmitted by the counterpart node via the tunnel established between the GGSN 400 and the PDG 500 of the WLAN. In contrast, when the UE 300 transmits a packet to a counterpart node, the packet is delivered to the counterpart node through the established connection between the GGSN 400 and the PDG 500.

In FIGS. 4 and 5, the cellular network can be any of UMTS, GSM, CDMA, and their equivalent networks, and the WLAN can be any of Wireless Fidelity (Wi-Fi) networks based on IEEE 802.11x standards. Though, the cellular network can be replaced with any of IEEE 802.1x and 802.2x based wireless IP networks.

Although exemplary embodiments of the present invention are described in detail hereinabove, it should be clearly understood that many variations and/or modifications of the basic inventive concepts herein taught which may appear to those skilled in the present art will still fall within the spirit and scope of the present invention, as defined in the appended claims and their equivalents.

As described above, the inter-network packet transmission method and system of exemplary embodiments of the present invention enables transmitting packets seamlessly across heterogeneous technology-based networks. Also, the inter-network packet transmission method and system of exemplary embodiments of the present invention can achieve a high quality of service, particularly in delay sensitive data transmissions, by delivering packets through the shortest routing path.

Also, the inter-network packet transmission method and system of exemplary embodiments of the present invention enables transmitting real time streaming data to UEs roaming across heterogeneous networks without modification of the previously defined system architecture. In exemplary embodiments of the present invention, a new network interface is defined between the GGSN of a cellular network and the PDG of a WLAN and a routing table update is accomplished by exchanging information between the GGSN and PDG, resulting in seamless handover between the cellular network and WLAN.

Also, the inter-network packet transmission method and system of exemplary embodiments of the present invention is advantageous in securing a seamless real-time packet service for a UE roaming across heterogeneous networks.

What is claimed is:

1. An inter-network packet transmission method comprising:
   performing a handover from a second network to a first network;
   tunneling between a user equipment and a first gateway of the first network based on an address of the first gateway;
   tunneling between the first gateway of the first network and a second gateway of the second network through an interface;
   transmitting a routing table update request message from the first gateway to the second gateway through the tunnel between the gateways, the routing table update request message being for requesting the second gateway to update its routing table with the address of the first gateway;
   updating a routing table of the second gateway using the address of the first gateway in response to the routing table update request message;
   forwarding packets for the user equipment from the second gateway to the first gateway through the tunnel between the gateways based on the updated routing table of the second gateway;
   forwarding the packets received from the second gateway to the user equipment; and
   releasing, at the user equipment, a data communication session with the second gateway, when packet forwarding is successful,
   wherein the first gateway is a Packet Data Gateway of a wireless local area network, and
   wherein the second gateway is a Gateway GPRS Support Node of a cellular network.

2. The inter-network packet transmission method of claim 1, wherein the releasing of a data communication session comprises releasing a data communication session previously established with one of the gateways after the packets are successfully received by the user equipment.

3. The inter-network packet transmission method of claim 1, wherein the forwarding of the packets comprises forwarding the packets from one of the gateways to another of the gateways through the interface prior to forwarding the packets to the user equipment.

4. The inter-network packet transmission method of claim 1, wherein the tunneling between the gateways is initiated after a handover of the user equipment from to one of the gateways is initiated.

5. The inter-network packet transmission method of claim 1, wherein the tunneling between one of the gateways and the user equipment is initiated after a handover of the user equipment to the one of the gateways is initiated.

6. An inter-network packet transmission method comprising:
   performing a handover from a cellular network to a wireless local area network;
   tunneling between a user equipment and a first gateway of the wireless local area network based on an address of the first gateway of the wireless local area network;
   tunneling through an interface established between the first gateway of the wireless local area network and a second gateway of the cellular network to which the user equipment was previously connected;
   requesting, at the first gateway, an update of a routing table to the second gateway through the interface, the update of the routing table being for requesting the second gateway to update its routing table with an address of the first gateway requesting the update of the routing table;

updating, at the second gateway, the routing table using the address of the first gateway;

forwarding packets destined to the user equipment from the second gateway to the first gateway through the interface based on the updated routing table of the second gateway;

forwarding the packets from the first gateway to the user equipment; and releasing, at the user equipment, a communication session with the second gateway when packet forwarding is successful, wherein the first gateway is a Packet Data Gateway of the wireless local area network, and wherein the second gateway is a Gateway GPRS Support Node of the cellular network.

7. The inter-network packet transmission method of claim 6, wherein the releasing of a data communication session comprises releasing a data communication session previously established with the Gateway GPRS Support Node after the packets are successfully received by the user equipment.

8. The inter-network packet transmission method of claim 6, wherein the tunneling between the user equipment and the first gateway is initiated after a handover of the user equipment to the first gateway is initiated.

9. An inter-network packet transmission method comprising:

performing a handover from a wireless local area network to a cellular network;

tunneling between a user equipment and a second gateway of the cellular network based on an address of the second gateway of the cellular network;

tunneling through an interface established between the second gateway of the cellular network and a first gateway of the wireless local area network to which the user equipment was previously connected;

requesting, at the second gateway, an update of a routing table to the first gateway through the interface, the update of the routing table being for requesting the first gateway to update its routing table with an address of the second gateway requesting the update of the routing table;

updating, at the first gateway, the routing table using the address of the second gateway;

forwarding packets destined for the user equipment from the first gateway to the second gateway through the interface based on the updated routing table of the first gateway;

forwarding the packets from the second gateway to the user equipment; and releasing, at the user equipment, a communication session with the first gateway, when packet forwarding is successful, wherein the second gateway is a Gateway GPRS Support Node (GGSN) of the cellular network, and wherein the first gateway is a Packet Data Gateway (PDG) of the wireless local area network.

10. The inter-network packet transmission method of claim 9, wherein the releasing of a data communication session comprises releasing a data communication session previously established with the Packet Data Gateway after the packets are successfully received by the user equipment.

11. The inter-network packet transmission method of claim 9, wherein the tunneling between the user equipment and the second gateway is initiated after a handover to the second gateway is initiated.

12. An inter-network packet transmission system comprising:

a user equipment configured to:
perform a handover from a cellular network to a wireless local area network;
establish a first tunnel with one of a Packet Data Gateway (PDG) of the wireless local area network based on an address of the PDG and a Gateway GPRS Support Node (GGSN) of the cellular network; and
establish a second tunnel between the PDG of the wireless local area network and the GGSN of the cellular network through an interface;

wherein the PDG transmits a routing table update request message to the GGSN through the second tunnel, the routing table update request message requesting the GGSN to update its routing table with the address of the PDG, wherein the GGSN updates its routing table by using the address of the PDG in response to the routing table update request message, wherein the GGSN forwards packets for the user equipment to the PDG through the second tunnel between the gateways based on the updated routing table of the GGSN, and wherein the user equipment releases a data communication session with the GGSN when packet forwarding is successful.

13. The inter-network packet transmission system of claim 12, wherein the first tunnel is established between the PDG and the user equipment.

14. The inter-network packet transmission system of claim 13, wherein packets are forwarded through the second tunnel and then forwarded through the first tunnel.

15. The inter-network packet transmission system of claim 12, wherein the first tunnel is established between the GGSN and the user equipment.

16. The inter-network packet transmission system of claim 15, wherein packets are forwarded through the second tunnel and then forwarded through the first tunnel.

17. The inter-network packet transmission method of claim 1, wherein the Packet Data Gateway is directly connected to a packet data network and is connected to an Access Router (AR) of the wireless local area network, the AR being connected to at least one Access Point (AP) to which the user equipment connects, and wherein the Packet Data Gateway sends a routing table along with the routing table update request message when transmitting the routing table update request message to the Gateway GPRS Support Node.

18. The inter-network packet transmission method of claim 6, wherein the Packet Data Gateway is directly connected to a packet data network and is connected to an Access Router (AR) of the wireless local area network, the AR being connected to at least one Access Point (AP) to which the user equipment connects.

19. The inter-network packet transmission method of claim 9, wherein the Packet Data Gateway is directly connected to a packet data network and is connected to an Access Router (AR) of the wireless local area network, the AR being connected to at least one Access Point (AP) to which the user equipment connects.

20. The inter-network packet transmission system of claim 12, wherein the PDG is directly connected to a packet data network and is connected to an Access Router (AR) of a wireless local area network, the AR being connected to at least one Access Point (AP) to which the user equipment connects.

* * * * *